Dec. 24, 1935.   F. E. WOODWARD   2,025,430
AUTOMATIC GEAR SHIFT MECHANISM
Filed Sept. 19, 1933   5 Sheets-Sheet 1
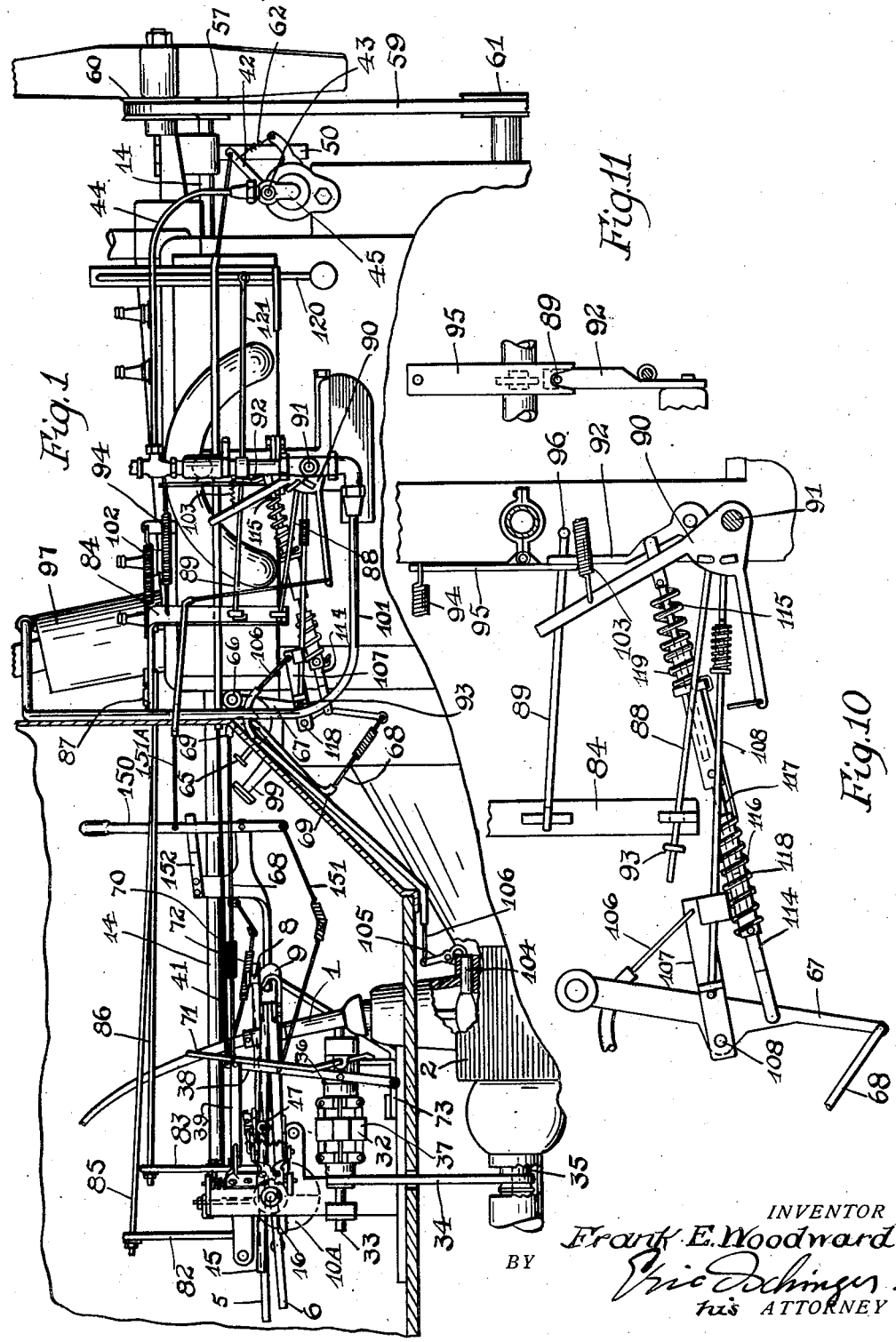
INVENTOR
Frank E. Woodward
BY
his ATTORNEY Dec. 24, 1935.  F. E. WOODWARD  2,025,430
AUTOMATIC GEAR SHIFT MECHANISM
Filed Sept. 19, 1933  5 Sheets-Sheet 2
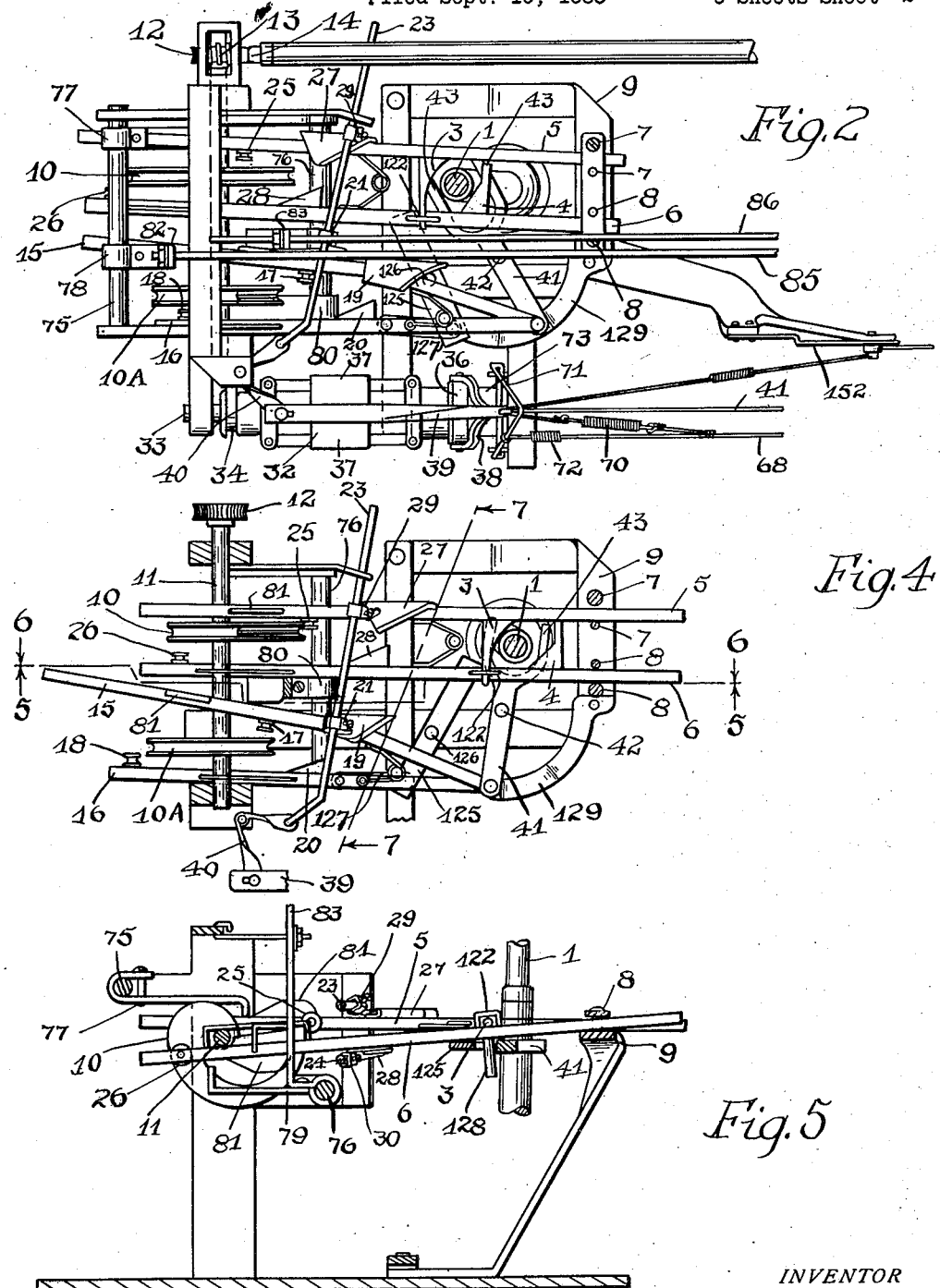
INVENTOR
Frank E. Woodward
BY
his ATTORNEY Dec. 24, 1935. F. E. WOODWARD 2,025,430
AUTOMATIC GEAR SHIFT MECHANISM
Filed Sept. 19, 1933 5 Sheets-Sheet 3
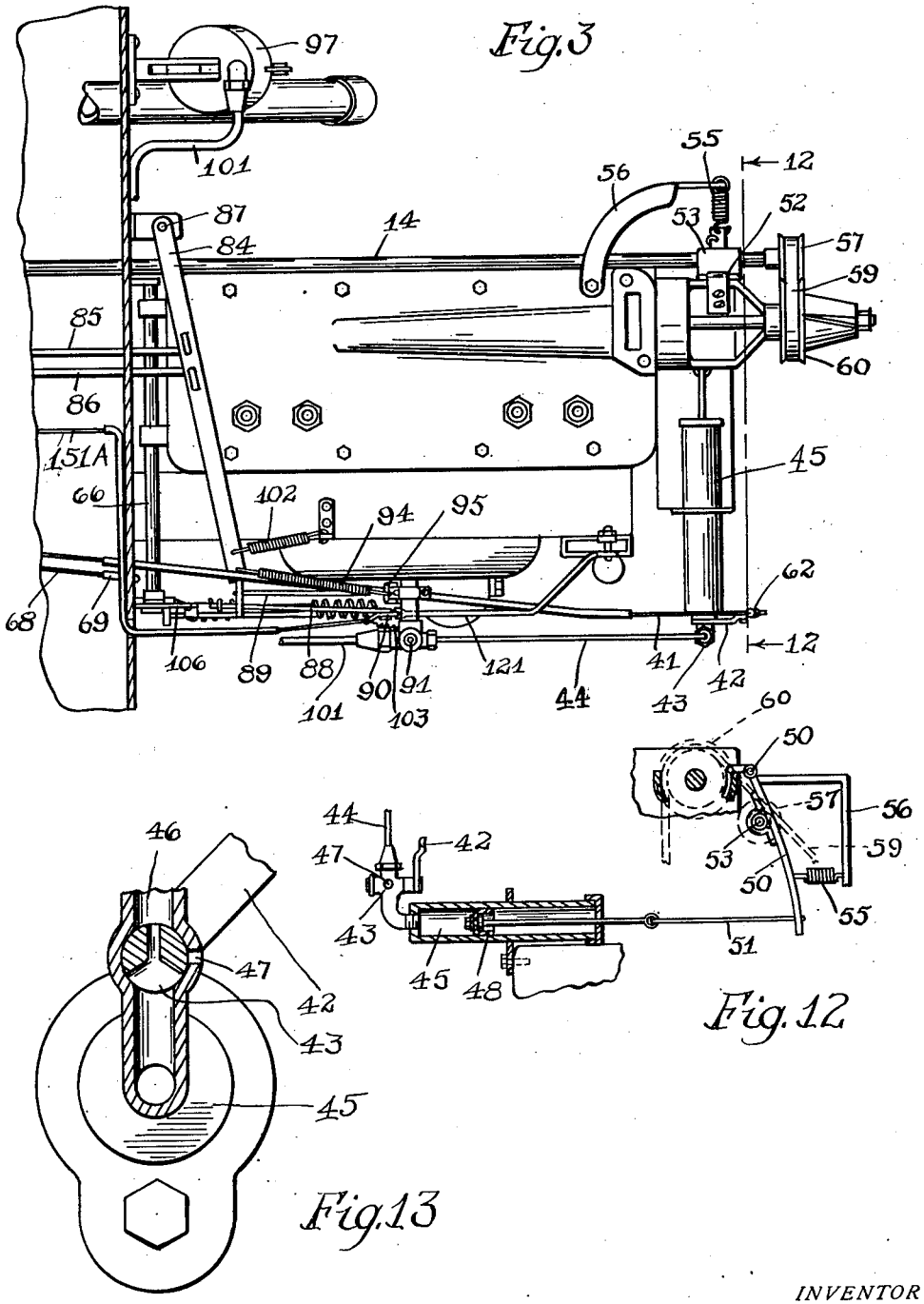
INVENTOR
Frank E. Woodward
BY
his ATTORNEY Dec. 24, 1935.  F. E. WOODWARD  2,025,430
AUTOMATIC GEAR SHIFT MECHANISM
Filed Sept. 19, 1933  5 Sheets-Sheet 4
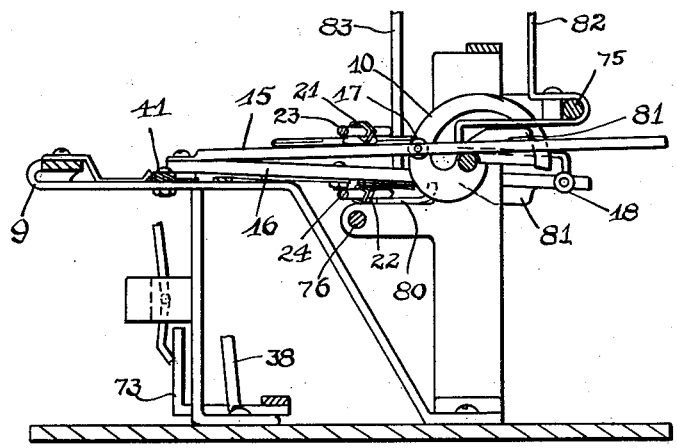
Fig. 6
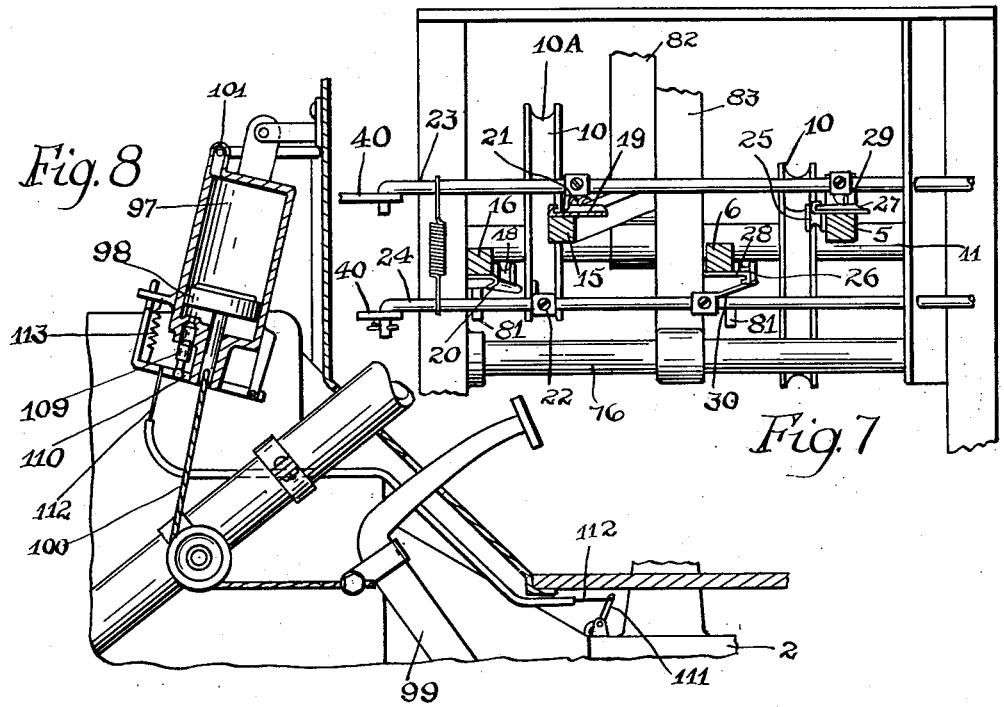
Fig. 8
Fig. 7
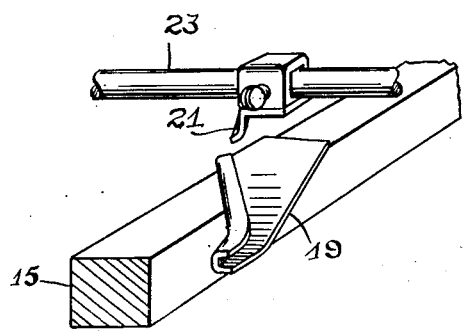
Fig. 9
INVENTOR
Frank E. Woodward
BY
his ATTORNEY Dec. 24, 1935.　　　F. E. WOODWARD　　　2,025,430
AUTOMATIC GEAR SHIFT MECHANISM
Filed Sept. 19, 1933　　　5 Sheets-Sheet 5
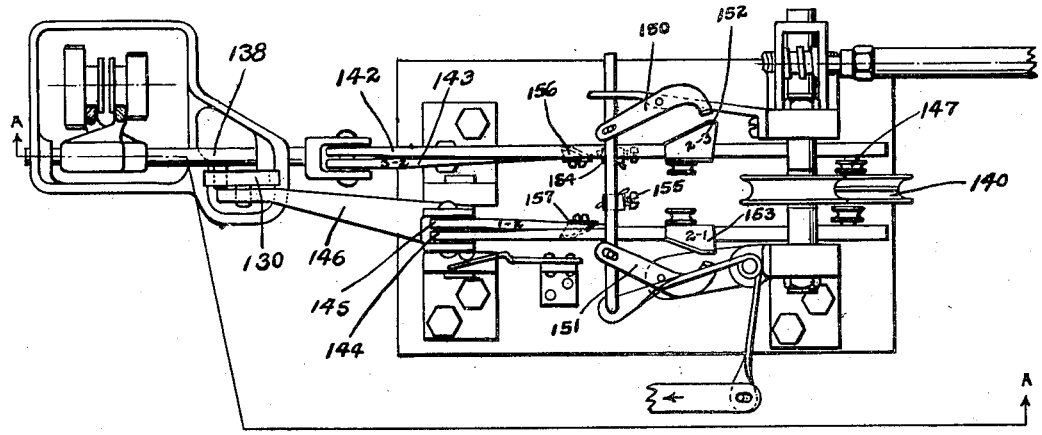

Patented Dec. 24, 1935

2,025,430

UNITED STATES PATENT OFFICE 2,025,430

AUTOMATIC GEAR SHIFT MECHANISM

Frank E. Woodward, Rochester, N. Y.

Application September 19, 1933, Serial No. 690,101

16 Claims. (Cl. 74—336.5)

This invention relates to automatic gear shift mechanisms and has for one of its objects to provide means whereby the sliding gears of a standard sliding gear transmission are automatically shifted to progressively select for all of the forward speeds of the transmission the proper ratios in the gearing to synchronize with the car's momentum.

Another object of this invention is to provide means whereby the shifting of the gears is automatically delayed in shifting from low to higher gear and accelerated when shifting from high to lower gear when the vehicle is driven uphill or at any time when more gas is fed to the engine to increase its power, as for example, for a quick get away or a hard pull out of a difficult position.

Another object of this invention is to drive the shifting mechanism directly from the engine or motor and the controlling mechanism from the drive shaft of the car in order to secure a quick and practically uniform shifting of the gearing for all forward speeds of the transmission.

A further object of this invention is to so construct the automatic shifting mechanism that it may be combined with various so-called free wheeling mechanism and located either above or to one side of the transmission so as to make it applicable to all makes of cars having a standard sliding gear transmission.

All these and other objects and attendant advantages of this invention will become more readily apparent from the detailed description of one embodiment thereof which follows, reference being had to the accompanying drawings in which Figure 1 is a side elevation of my automatic gear shifting mechanism illustrating one form of application and mounting on a standard make of car.

Figure 2 is an enlarged top plan view of the automatic gear shifting mechanism as it appears when the gears of the transmission are held in "low gear" thereby.

Figure 3 is an enlarged top plan view of the engine of a car provided with the driving connection for the automatic gear shift mechanism and part of the control mechanism for the control of the free wheeling clutch mechanism used in connection with the automatic gear shift mechanism.

Figure 4 is a detail top plan view of a portion of the automatic gear shift mechanism as it appears when the transmission has been advanced to "second gear" thereby.

Figure 5 is a longitudinal vertical sectional view of the automatic gear shift mechanism, the section being taken on the line 5—5 of Figure 4.

Figure 6 is a longitudinal vertical sectional view of the mechanism taken on the line 6—6 of Figure 4 looking in the direction of the arrow.

Figure 7 is a transverse vertical sectional view of the mechanism taken on the line 7—7 of Figure 4.

Figure 8 is a partial side elevation and vertical sectional view of the clutch operating mechanism.

Figure 9 is an enlarged detail perspective view of one of the one way cam connections used for the operation of the shifting mechanism by the governor.

Figure 10 is an enlarged detail side elevation of the throttle operating mechanism of the carburetor of the engine and its connection with the automatic clutch operating mechanism.

Figure 11 is a detail elevation of the lever connection which limits the movement of the gas throttle.

Figure 12 is a detail vertical sectional view of the mechanism for cutting out the automatic gear shift mechanism after the car has attained a predetermined high speed in the high gear at which speed and higher speeds the gear shift mechanism need not function, the section of the figure being taken on the line 12—12 of Figure 3.

Figure 13 is an enlarged end elevation and sectional view of the vacuum cylinder and control valve respectively of the mechanism illustrated in Figure 12.

Figure 14 is a top plan view of a simplified form of my automatic gear shift mechanism.

Figure 15 is a side elevation thereof.

Figure 16 is an enlarged detail perspective view of one of the cams and cam rollers for operating the shifting mechanism.

In the several figures of the drawings like reference numerals indicate like parts.

The automatic gear shift mechanism forming the subject matter of my present invention may be used in any type of engine driven self propelled vehicle having a sliding gear transmission to cause this transmission to be operated automatically for all forward speeds to select the proper gear ratios in the transmission which synchronizes with the momentum of the vehicle. Thus the transmission will be progressively shifted by means of my invention from low gear to second gear and then to high gear at predetermined speeds of the vehicle. It will shift the transmission back to second gear when the car is slowed down to the predetermined slower pace and shift it to high again after the vehicle has again attained the predetermined higher pace, or the transmission will be shifted from the high gear to the second and then to the low gear as the vehicle is slowed down to the predetermined slow pace at which the car need be driven in low gear to prevent the stalling of the engine.

In the application of my invention to a self propelled vehicle it is necessary to provide the vehicle with an automatically operated or free wheeling clutch mechanism which is controlled by the automatic gear shift mechanism to disengage and reengage the clutch during the time the gears of the transmission are automatically shifted. In the embodiment of my invention as illustrated in the drawings I have shown a vacuum operated clutch mechanism and while I have found this type of clutch control to give satisfactory and reliable results in combination with my invention, it is to be understood that I do not wish to limit myself to this type of clutch control, but consider that I am at liberty to use other types of clutch controls in connection with my invention as fairly come within the scope of the appended claims.

The automatic gear shift mechanism which will now be described comprises a suitable frame work which, as illustrated in Figure 1, is mounted in suitable relationship to the gear shift lever 1 of the sliding gear transmission 2 to permit the engagement of the cam lugs 3 and 4 of the shift bars 5 and 6 respectively with the front and back of the shift lever as illustrated in Figures 2 and 4. The shifting bars 5 and 6 are adapted to slide longitudinally back and forth between the guide pins 7, 7 and 8, 8 carried by the supporting member 9. The longitudinal movement of the shift bars 5 and 6 is secured by the cam 10 mounted on the cam shaft 11 and driven by a suitable worm gear 12 and worm 13 by the flexible shaft 14 as will hereinafter be described.

A similar longitudinal movement is imparted to the shift bars 15 and 16 by means of the cam 10A which is also mounted on the cam shaft 11. For this purpose shift bar 15 carries the cam roller 17 in front of the cam shaft 11 while bar 16 carries the cam roller 18 in back of the cam shaft 11. In addition to the cam rollers the shift bars 15 and 16 also carry the cam slides 19 and 20 respectively as illustrated in Figure 7. These cam slides are adapted to be engaged by the cam lugs 21 and 22 carried by the sliding links 23 and 24 respectively with which the cam lugs are brought in engagement with the cam slides of the shifting bars in order to swing one or the other of these bars laterally and bring its cam roller in line with the peripheral cam surface of the cam 10A. The sliding links are shifted by means of a governor and their operation and movement by the governor will hereinafter be described.

The shift bars 15 and 16 are pivotally connected at their forward end to the outer end of the arm 41. This arm is mounted to swing on the pivot pin 42 and its bifurcated inner end 43 embraces the shift lever 1. On the forward movement of the sliding rod 15 by the cam 10A, the arm 41 is thus moved to shift the shift lever 1 rearwardly, while a rearward movement of the sliding rod 16 by the cam 10A will cause the arm 41 to move forwardly.

The shift bars 5 and 6 which also shift the shift lever forward and back are similarly provided with the cam rollers 25 and 26 respectively, one in front of the cam shaft and the other in back thereof as illustrated in Figures 2 and 4. The shift bars 5 and 6 are also so provided with the cam slides 27 and 28 respectively which are adapted to be engaged by the cam lugs 29 and 30 carried by the sliding links 23 and 24 respectively. On the lateral movement of the sliding links the cam lugs are thus adapted to swing either one or the other of the shift bars 5 and 6 so as to bring its cam roller in line with the peripheral cam surface of the cam 10 so as to cause this cam, during its rotation, to engage the cam rollers and when engaging the roller 25 force it to the right in Figures 2 and 4 and move the shifting rod 5 to shift the shift lever 1 forward by means of the cam lug 3, and when engaging cam roller 26 move the shifting rod 6 to draw the shift lever 1 back again by means of the lug 4.

As above pointed out the shifting links 23 and 24, which shift the various shifting bars to bring their cam rollers alternately in operative relationship with the cams 10 and 10A, are operated by a governor 32. This governor is mounted on the governor shaft 33 located alongside of the shifting mechanism heretofore described, as is shown in Figures 1 and 2. A driving belt 34 connects and drives the governor from the drive shaft 35 of the vehicle in order to cause the governor to control the operation of the shifting mechanism with relation to the momentum or speed of the vehicle. The lateral movement of the sliding collar 36 of the governor 32, caused by the outward and inward movement of the governor balls or weights 37, is transmitted thru the lever arm 38, links 39, 39 and bell cranks 40, 40 to the shifting rods 23 and 24. As the governor weights 37 gradually fly outwardly on the gradual increase of the speed or momentum of the vehicle, the shift rods 23 and 24 are thus moved to the left in Figure 7 by the connection between the governor and the shifting rods and on the gradual decrease of the momentum of the vehicle these rods are moved back to the right in Figure 7.

The cam lugs 21 and 29, carried by the shift rod 23 and the cam lugs 22 and 30, carried by the shift rod 24, are so arranged that on the gradual increase of the momentum of the vehicle from the predetermined low gear speed, the cam lug 29 will first engage the sliding cam 27 of the sliding bar 5 and shift this bar to the left in Figure 7 to bring its cam roller 25 in line with the peripheral cam surface of the cam 10. The rotation of this cam then forces the shift bar from the low gear position illustrated in Figure 2 forward by means of the cam lug 3 and moves the shift lever first to its neutral position, then shifts it laterally by means of the cam surface of the cam lug 3 and then moves it forward again until it has reached the position illustrated in Figure 4 in which the gear transmission is in second gear.

The further predetermined increase of the momentum of the vehicle operates the governor to shift the sliding rod 23 until its cam lug 21 engages the sliding cam 19 of the shifting bar 15 and swings this bar laterally until its cam roller 17 is in line with the peripheral cam surface of the cam 10A. The rotation of this cam then forces the shift bar 15 forwardly or to the right in Figure 4 and swings the bifurcated lever to move the shifting lever 1 rearwardly or straight to the left in Figure 4 in order to bring the transmission from second gear into high gear.

As illustrated in Figure 2 the pivotal connection of the link 39 with the bell cranks 40 has an elongated slot which provides a lost motion in the transmission of the movement of the governor to the shift rods 23 and 24. Due to this lost motion the shift bars 23 and 24 are never entirely returned to their starting position as the governor is slowed down. For this reason it is necessary to move these shifting rods back to their starting position by means of the cam slides 19, 20, 27 and 28. These cam slides, as previously described, are carried by the shift bars and are engaged by the cam lugs 21, 22, 29 and 30 to shift the shift bars laterally for the engagement of their roller by the cams 10 and 10A. The cam slides 19 to 28 are provided with angular cam grooves which are so arranged that if on the return movement of a shift bar, the cam lug, which has previously operated it is not in its starting position and it is necessary for this lug to operate this same shift bar again, the cam groove will engage this lug and force it back to its starting position on its movement with the shift bar. This happens for example when the shifting mechanism has shifted from low to second and back to low again because in this case the governor cannot move the shift rods 23 and 24 back to their starting position due to the lost motion provided in the link connection between the governor and the bell cranks which operate the shift rods.

After the transmission has been automatically shifted into high there is no need for further operation of the shifting mechanism if the transmission is to remain in high and the momentum of the car is increased. For this reason the governor arm 38 is connected by a cable 41 with the operating lever 42 of the two way valve 43. This valve controls the vacuum line 44 which connects the vacuum cylinder 45 with the intake manifold of the engine. The valve has two ports 46 and 47, one leading to the vacuum line and the other into the atmosphere. While the momentum of the vehicle is between the predetermined limits in which it may be necessary for the automatic gear shift mechanism to operate, the valve 43 is held in the position in which the port 47 thereof is connected with the inside of the cylinder. The atmospheric pressure within the cylinder thus allows the piston 48 to be pulled to the right in Figure 12. The piston rod 49 of the piston is connected with the arm 50 by means of the cable or link 51. The arm 50 is pivoted to a portion of the engine block or a member thereof and carries a clamp 53 by which the sleeve of the flexible shaft 14 is fastened thereto. Anchored to the arm 50 is a spring 55 which is stretched between it and the bracket 56 to normally pull the bracket to the right in Figure 12 and force the pulley 57 mounted on the end of the flexible shaft 14 against the inside of the endless belt 58 which travels over and drives the fan shaft pulley 60.

The fan shaft pulley is positively driven by the belt 59 from the pulley 61 which in turn is driven by the engine so that the motion imparted to the flexible shaft for the operation of the shifting mechanism is in direct relationship to the speed of the engine and is not affected by the momentum of the vehicle.

As above pointed out, it is not necessary for the automatic gear shift mechanism to operate above a predetermined high speed until the vehicle is again slowed down below this speed ready to shift the gearing on the approach to the predetermined lowered speeds where it is necessary to shift the gears. On the attainment of the high speed above mentioned, the governor therefore operates to pull the cable 41 to the left in Figures 1 and 3 and swings the valve into the position illustrated in Figure 13 in which it has closed the port 47 and opened the port 46 to exhaust the air from the cylinder 45 and create a partial vacuum therein by reason of its connection with the vacuum line 44. The piston 48 is thus forced by the atmospheric pressure into the cylinder 45 and draws the cable or link 51 with it to swing the arm 50 to the left in Figure 12 to move the pulley 57 out of frictional contact with the belt 59. The pulley 57 then no longer rotates the flexible shaft 14 and causes the cam shaft 11 with its cams 10 and 10A to stop.

A decrease of the momentum of the vehicle to below the predetermined high speed will swing the arm 38 of the governor to release its pull on the cable 41 and permit the spring 62 to operate the valve 42 and admit atmospheric pressure into the cylinder 45 thru the port 47. This destroys the partial vacuum created in the cylinder 45 and permits the spring 55 to pull the arm 50 to the right in Figure 12 and bring the pulley 57 again into frictional contact with the belt 59 so as to rotate the pulley and resume the driving of the flexible shaft 14 for the operation of the gear shift mechanism.

The action of the shifting mechanism so far described takes place when the vehicle is driven on level ground and a normal amount of gas is fed to the engine in order to have the engine supply enough power to smoothly drive the vehicle in its accelerated or decelerated speeds.

If more power is needed to drive the vehicle for given speeds, as for example in driving uphill, or in pulling one or more of the wheels of the vehicle out of a hole, or for a quick get away; in fact for any condition in which more gas is fed to the carburetor in order to have the engine furnish the additional power, the operation of the shifting mechanism is automatically delayed when shifting from low into higher gear and accelerated when shifting from high into lower gear. This is made possible by the operation of governor arm 38 thru the accelerator pedal 65, as follows:

The accelerator pedal arm 65 is mounted on the rock shaft 66 and when depressed to feed more gas to the engine, rocks this shaft to swing the arm 67 to the right in Figure 1. To the end of the arm 67 is fastened the cable 68 which is guided thru a suitable guide sleeve 69 to substantially the same elevation as the top of the lever arm 38 on the governor so that it can be attached thereto in a substantially horizontal position by means of the spring 70. In addition to being attached to the lever arm 38, the cable 68 is also attached by means of the spring 72 to a second lever arm 71 located ahead of the lever arm 38. Lever arm 38 is mounted to swing on the sliding base 73 and this base has an upright member at one end thereof with which the lower end of the lever arm 71 makes contact. When therefore the pedal 65 is depressed the cable 68 pulls both of the lever arms 38 and 71 to swing to the right in Figure 1. This causes the lower end of lever 71 to shift the sliding base 73 to the left and with it the lower end of the lever arm 38 which is mounted to swing thereon. At the same time the upper end of the lever arm 38 is pulled to the right so that this lever assumes a new angular starting position which makes it necessary for the governor to attain a higher speed before it will operate the shifting mechanism. This delays the shifting operation of the mechanism from low to high gear and accelerates the shifting operation from high to low gear.

The mechanism which automatically disengages the clutch of the vehicle before each shifting operation and reengages it after each shifting operation comprises a pair of rock shafts 75 and 76 which are suitably mounted to the left and above the cam shaft 11 and to the right and below this shaft as illustrated in Figure 5. A pair of arms 77 and 78 is mounted on the rock shaft 75 and a pair of arms 79 and 80 is carried by the rock shaft 76. Each of these arms is located with relation to one of the shift bars 5, 6, 15 and 16 and each of these shift bars carries a cam 81 which, when the shift bar is moved by its cam 10 or 10A, operates its arm and rocks the rock shaft by which the arm is carried. One of the arms of each pair of arms carried by one of the rock shafts 75 or 76 extends upwardly to provide the vertical arms 82 and 83 and the cams 81 on the shift bars are so arranged that these vertical arms swing to the left in Figure 1 before each shifting operation by the shifting mechanism heretofore described and are allowed to swing back to the right to their starting position after each shifting operation has been completed by the shifting mechanism.

The arms 82 and 83 are connected with the lever arm 84 by means of the links 85 and 86 as illustrated in Figures 1 and 3. The lever arm 84 is pivoted at 87 above the engine block and its outer end is bent down over the side of the engine and carries the links 88 and 89. Link 88 is adapted to operate the lever 90 of the vacuum valve 91 to which it is anchored and link 89 is adapted to operate lever 92 of the throttle valve of the carburetor of the engine and is slidably connected thereto. As illustrated in Figure 10, link 88 has a sliding connection with the lever arm 84 and carries the collar or lug 93 to permit the lever arm 84 to move a short distance before it engages the collar 93 and moves the link 90 to operate the vacuum valve 91. During this delayed operation of the vacuum valve by the lever 84, the spring connection 94 between the lever arm 84 and a lever 95, swings this lever to have its lower end engage the upper end of the lever 92 to move the lever 92 to the right in Figures 1 and 10. At the same time link 89 is moved to the left in Figures 1 and 10 by the lever arm 84. Link 89 carries a lug 96 at its outer end so that while the lever 92 is moved to the right by the lever 95 to open the throttle valve, lug 96 is moved to the left to stop the movement of the throttle lever after it has been moved a short distance sufficient to increase the speed of the engine and the momentum of the car before the clutch is disengaged.

As previously pointed out the clutch is operated by the partial vacuum created in the intake manifold of the engine. For this purpose a vacuum cylinder 97 is pivotally supported on the frame of the vehicle and its piston 98 is connected with the clutch pedal arm 99 by means of the cable 100. The upper end of the cylinder 97 is suitably connected with the intake manifold of the engine by means of the vacuum line 101 and in this line is located the vacuum valve 91 heretofore mentioned. On the operation of one or the other of the vertical arms 82 and 83, the vacuum valve is operated as above described so as to connect the partial vacuum of the intake manifold with the cylinder 97 and exhaust the air therefrom and cause the piston to be forced up into it by the atmospheric pressure so as to pull the clutch pedal arm 99 to the left in Figure 8 in order to disengage the clutch before each shifting operation.

After the shifting operation is completed the cams 81 of the shifting bars have been moved to permit the spring 102 to pull the lever arm 84 back to its normal position and in doing so allow spring 103 to swing the lever 90 back to the right in Figures 1 and 10 so as to operate the vacuum valve to close the vacuum line to the partial vacuum in the intake manifold and open it to the atmosphere. The piston 98 is thus released which permits the spring pressure acting on the clutch to reengage the clutch and pull the piston 98 thru the cable 100 into the lower end of the cylinder for the next disengagement of the clutch.

To provide a smooth engagement of the clutch after each shifting operation the engagement is delayed in low gear and accelerated in high gear. For this purpose the plunger 104, provided in the sliding gear transmission 2 as illustrated in Figure 1 and pushed outwardly by the low shift gear operation, engages one end of the lever 105 and rocks this lever to pull the cable 106 to the left in Figure 1. The end of this cable 106 is fastened to the arm 107 which is pivotally mounted at 108 to the arm 67. The pull on the cable 106 by the lever 105 thus swings the arm towards the left in Figures 1 and 10. As arm 107 is connected to the vacuum valve lever 90 by means of the link 108, the action of the arm 107 will delay the operation of the vacuum valve to reengage the clutch until the arm 67 has operated the throttle valve to a position where the engine speed has been increased for a smooth engagement of the clutch in low gear.

In order to provide a smooth engagement of the clutch in high gear the engagement of the clutch should be quick and for this reason a valve 109 is provided at the bottom of the vacuum cylinder 97. This valve is carried by the swinging arm 110 which is connected to the lever 111 by means of the cable 112. The lever 111 is similar to the lever 105 heretofore described but is operated by a plunger which is pushed outwardly by the high gear shift operation. As the lever 111 is therefore rocked on shifting in high gear, the cable 112 is pulled by it to swing the arm 110 against the resistance of the spring 113 and open the valve to permit the air in the cylinder below the piston to be forced out quickly for a quick engagement of the clutch.

The operation of the throttle lever 92 by the accelerator pedal is provided thru a link connection between the arm 67 and the throttle lever which comprises a pair of links 114 and 115, one of which carries a sleeve 116 while the other is provided with a sliding extension 117 which is adapted to telescope in and out of the sleeve 116.

If for any reason the clutch engages so as to cause a jerky motion of the vehicle, the pendulum pivotally suspended near the front of the engine, swings toward the left in Figure 1 so that the free end of the link 121 moving with the pendulum and connected thereto, engages the lever 90 of the vacuum valve and moves it to cause the clutch to be momentarily disengaged.

In order to provide a delayed action of the actual shifting operation to give the clutch operating mechanism a chance to perform its operation slightly ahead of the actual shifting operation, the cam lugs 3 and 4 carried by the shifting bars 5 and 6 respectively, are spaced from each other to provide a space either ahead or behind the shift lever 1. In the same way the ends of the bifurcated lever 41 are spaced so as to provide a similar space between them and the shift lever. The two shift bars 5 and 6 are connected by the engagement of the outer end of the cam lug 3 of the shift bar 5 with the yoke 122 carried by the shift bar 6. The shift bars 5 and 6 in their movement thus maintain a uniform space between their respective cam lugs 3 and 4. In shifting from low gear to second the extra space provided between the cam lugs 3 and 4 is located between the lug 3 and the shifting lever 1 so as to provide a lost motion in the movement of shift bar 5 before it makes contact with the shift lever. During the lost motion thus provided the clutch is disengaged. In the same way the extra space in the bifurcated end of the lever arm 41 is located between the right hand end thereof and the shifting lever in order to provide a lost motion in the movement of the lever arm before the gears are shifted from second gear into high gear. After the gears are shifted back from high gear into second, the sliding bars 5 and 6 must be relocated to provide the extra space between the shift lever and the lug 4 of the shift bar 6. This is due to the fact that in shifting the shift lever from high gear into the second gear by means of the bifurcated lever 41, the shift bars 5 and 6 will not follow the shift lever until the space between the lug 4 and the shift lever has been traversed by the shift lever. In order to relocate the shift bar 6 so as to provide a lost movement of the shift bar 6 before it operates on the shift lever, the lever 125 is pivoted at 126 and is pivotally connected with one end thereof to the shift bar 16 by means of the link 127. The movement of the shift bar 16 to the left in Figure 4 when shifting the shift lever from high to second gear, thus swings the lever 125 to have its free end engage the pin 128 which depends from the shift bar 6. This moves this shift bar 6 an extra short distance to the right to provide the space needed between the shift lever and the cam lug 4 to secure the lost motion between the shift bar 6 and the shifting lever for shifting the shifting lever 1 from second gear into low gear.

A suitable spring pressed member 129 engages the under side of the lever arm 41 to yieldingly hold it and its associated parts in their proper position after each operation thereof by the shifting bars 15 and 16.

When it is desirable to have the transmission shifted from high gear into second while descending a hill in order to have the compression of the engine assist in braking the vehicle while in second gear, the lever arm 150 is pulled to the left in Figure 1. This lever arm is connected with the governor arm 38 by means of the yielding connecting cable 151. While in high gear the governor arm 38 is swung to the left so that the slack is taken out of the connecting cable 151 in its connection between the lever arm 150 and the governor arm 38. Moving lever arm 150 to the left in Figure 1 until it is engaged by spring latch 152 therefore pulls the governor arm to the right ahead of the action of the governor and holds it in a position in which it causes the shifting mechanism to shift the transmission from high into second gear. The lever arm 150 will then keep the transmission in second gear until it is released from the spring latch 152 and moved back to its starting position.

In the simplified construction of shifting mechanism illustrated in Figures 14 and 15 the gears of the transmission are shifted and controlled by means of the sliding cam plate 130. This cam plate is suitably mounted to slide on the transmission housing preferably as illustrated in the figures to one side thereof in a vertical position. The cam plate is provided with two horizontal cam slots 131 and 132 which are located near the top and bottom of the plate respectively. The left hand end of the slot 131 has branching from it and extending to the middle of the plate the angular cam slot 133, while the right hand end of the cam slot 132 has a similar angular cam slot 134 branching from it and extending to the middle of the cam plate. A vertical cam slot 135 connects the ends of the angular cam slots 133 and 134. Two pins 136 and 137 engage into the cam slots. Of these, pin 136 is carried by the sliding shaft 138 and pin 137 by sliding shaft 139. These sliding shafts are ordinarily operated by the hand shifting lever which in this case is not shown in the drawings.

Only one cam 140 is used in the operation of the shifting mechanism illustrated in Figures 14 and 15 and this cam is mounted on the cam shaft 141 which is driven in the same way as the cam shaft of the shifting mechanism heretofore described. But two pairs of shift bars are used in this construction. Of these shift bars 142 and 143 are joined together at one end and pivotally connected to the end of the sliding shaft 138. The other two shift bars 144 and 145 are joined together at one end and are pivotally connected to one end of the bell crank 146. The other end of this bell crank in turn is pivotally connected to the bottom of the cam plate 130. Each of the shift bars carries a cam roller 147 so that each pair of shift bars has one roller on one side of the cam shaft and the other roller on the other side thereof. The shift bars are moved laterally by means of the shift rods 148 and 149 which are operated by the governor so that shift rod 148 swings the bell cranks 150 and 151 to engage the cam slides 152 and 153 respectively while shift rod 149 is operated to move cam lugs 154 and 155 to engage cam slides 156 and 157 respectively. The parts are so arranged that the governor operates to shift the shift rod 149 to move the shift bar 145 and bring its cam roller in line with the peripheral cam surface of the cam 140 so that on the rotation of this cam, shift bar 145 is forced to the left in the figures and swings the bell crank so as to move the cam plate from its highest position to its lowest position illustrated in Figure 15. During this movement of the cam plate, the sliding shaft 139 is first moved to the left by the cam slot 134 to a neutral position and then sliding shaft 138 is moved to the left by the cam slot 133 to the second gear position completing the shifting of the gears from low gear into second by this consecutive movement of these two shafts.

The operation of the governor to move sliding bar 144 by means of the bell crank 151 and cam slide 153 into operative position with relation to the cam 140 will of course operate the transmission to shift the gears from second into low again.

After the cam plate is in the position illustrated in Figure 15 the transmission is shifted from second gear into high by means of the shift bar 142 which is brought into operative position with relation to the cam 140 by means of the bell crank 150 and the cam slide 152. This shift bar is directly connected with the sliding shaft 138 and the horizontal cam slot 131 which, in this position is parallel to the slide shaft, permits the shift bar to pull the slide shaft to the right for the shifting of the gears from second into high gear.

Bringing the shift bar 143 in operative relation to the cam 140 will of course move the slide shaft 138 back to the left and shift the gearing from high back into second.

In Figure 16 I have illustrated one of the cams 10 and 10A with one of the cam rollers in position to be engaged thereby. Both of these cams and cam rollers are grooved and their engagement takes place near the center of the cam. At this point a portion of the peripheral cam surface is concentric with the center of the cam to permit the roller to be moved endwise in line with the peripheral cam surface of one side of the cam. A web 160 separates the two parallel ridges of the cam surface of the cam and prevents the cam rollers from being moved beyond the ridge with which it is adapted to make contact. Having one of the ridges of the grooved cam engage into the groove of the cam roller keeps the roller from sliding out of engagement with the cam during its movement thereby.

Operating the lever 150 by hand so as to cause the gear shift mechanism to shift from high into second gear on a downgrade, pulls the cable 151A so as to rock the vacuum valve lever 90 to admit atmospheric pressure into the cylinder 97. In this way the clutch is held engaged after the shifting operation has taken place.

I claim:

1. An automatic gear shift for sliding gear transmissions of self propelled vehicles having a throttle for the control of the engine of the vehicle, comprising shifting means for selectively shifting the sliding gears, driving means for said shifting means operated by the engine of the vehicle, selecting means, governor controlled means operated by the momentum of the vehicle for operating said selecting means and means operated by the throttle of the engine for lengthening the movement of the governor controlled means.

2. An automatic gear shift for variable transmissions of self propelled vehicles having a clutch for driving the transmission comprising shifting means for selectively operating said variable transmission, clutch operating means operated by said shifting means and means operated by said variable transmission for delaying and accelerating the action of said clutch operating means.

3. An automatic gear shift for variable transmissions of engine powered vehicles, comprising shifting means including selecting means and operating means, driving means connecting the engine with the operating means and governor controlled means for operating said selecting means during a predetermined range of speed of the governor and connecting and disconnecting means for connecting and disconnecting said driving means from the engine of the vehicle, governor controlled means for operating said connecting and disconnecting means beyond said predetermined range of speed of said governor.

4. In an automatic gear shift mechanism for variable sliding gear transmissions having a shifting member, the combination of a rotating cam member, a pair of shift bars each carrying a cam roller connected to said shifting member, governor controlled operating means moving one of said shift bars to have its cam roller engage said rotating cam member to cause it to shift said shifting member in one direction and moving the other of said shift bars to have its cam roller engage said cam member to cause it to shift said shifting member in the opposite direction on the rotation of said cam member.

5. In an automatic gear shift mechanism for variable sliding gear transmissions having a shifting member, the combination of a pair of shifting bars one on each side of said shifting member, a cam lug carried by each of said shifting bars one in front and the other behind said shifting member, and means for longitudinally moving said shift bars to have said cam lugs move said shifting member forwardly and to one side in one direction and rearwardly and to the opposite side in the other direction.

6. In an automatic gear shift mechanism for variable sliding gear transmissions having a shifting member, the combination of two pairs of shifting bars, a cam member for moving one of each pair of shift bars in one direction and the other of each pair of shift bars in the opposite direction, connecting means connecting said shift bars with said shifting member to cause one pair of shift bars to shift said shifting member and operate said transmission from low gear into second gear and from second gear into low gear, and cause the other pair of shift bars to shift said shifting member and operate said transmission from second gear into high gear and from high gear into second gear.

7. In an automatic gear shift mechanism for a variable transmission, the combination of means for shifting said transmision, operating means for said shifting means, a governor operated lever for bringing said shifting means into operative connection with its operating means and means for varying the normal position of said lever to cause said lever to accelerate or decelerate the operative connection between said shifting means and its operating means by said governor operated lever.

8. In an automatic gear shift mechanism for a variable transmission having a pair of sliding shafts, the combination of a movable cam plate movable transversely to said sliding shafts and having a cam slot therein, a member carried by each of said sliding shafts engaging into said cam slot to provide a permanent connection between said cam plate and said sliding shafts, means for moving said cam plate to successively move said sliding shafts in one direction and means connected to one of said sliding shafts to move it separately from said cam plate and the other of said cam shafts.

9. In an automatic gear shift mechanism for an engine driven vehicle having a variable transmission, the combination of a shifting mechanism having a plurality of shifting members, driving means connecting said engine with said shifting mechanism, governor controlled means for selecting said shifting members so as to operate said transmission from low gear into second and from second gear into high at predetermined speeds of the vehicle and means operated by said governor controlled means at another predetermined speed of the vehicle for disengaging said driving means from said engine.

10. In an automatic gear shift mechanism for a sliding gear transmission having a shifting member, the combination of a cam, means for rotating said cam, a shift bar engaging said shifting member, a cam roller carried by said shift bar, a shift rod, and means carried by said shift rod and engaging said shift bar to move said shift bar with its cam roller into position to have said cam engage said cam roller to move said shift bar and said shifting member in one direction.

11. In an automatic gear shift mechanism for a sliding gear transmission having a shifting member, the combination of a plurality of shifting bars engaging said shifting member, means for selectively moving said shifting bars, a clutch cooperating with said sliding gear transmission and means operated by each of said shifting bars to cause the engagement and disengagement of said clutch on the movement thereof.

12. In an automatic gear shift mechanism for a sliding gear transmission having a shifting member, the combination of a shift bar engaging said shifting member and carrying a cam slide, a cam for operating said shift bar, a shift rod carrying a cam lug, governor controlled means for operating said shift bar to move said cam lug into engagement with said cam slide and shift said shift bar into operative position with said cam for its movement in one direction, said cam slide of said shift bar engaging said cam lug on the return movement of said shift bar to return said shift rod and its cam lug to its starting position.

13. In an automatic gear shift mechanism for sliding gear transmissions having a shifting member, the combination of a pair of shift bars jointly movable back and forth one on each side of said shifting member, a cam lug carried by each of said shift bars one ahead and the other behind said shifting member, substantially parallel angular cam surfaces provided on said cam lugs to cause said shift bars on their movement to move said shifting member to move forward and laterally in one direction and rearward and laterally in the opposite direction, a bifurcated lever engaging said shifting member, a second pair of shift bars pivotally connected to said bifurcated lever to swing said lever on the movement of one of said second shift bars in one direction and move said shifting member to the rear, and swing said bifurcated lever on the movement of the other of said second pair of shift bars in the opposite direction and move said shifting member forward.

14. In an automatic gear shift mechanism for sliding gear transmissions having a shifting member, the combination of a pair of shift bars jointly movable back and forth one on each side of said shifting member, a cam lug carried by each of said shift bars one ahead and the other behind said shifting member, substantially parallel angular cam surfaces provided on said cam lugs to cause said shift bars on their movement to move said shifting member to move forward and laterally in one direction and rearward and laterally in the opposite direction, a bifurcated lever engaging said shifting member, a second pair of shift bars pivotally connected to said bifurcated lever to swing said lever on the movement of one of said second shift bars in one direction and move said shifting member to the rear, and swing said bifurcated lever on the movement of the other of said second pair of shift bars in the opposite direction and move said shifting member forward, said shifting member having space provided between it and said cam lugs of the first pair of shift bars and the ends of the bifurcated lever operated by the second pair of shift bars and shift means operated by said second pair of shift bars and operating on said first pair of shift bars to shift said first pair of shift bars to locate the space between its cam lugs and the shifting member on one side of said shifting member.

15. In an automatic gear shift mechanism for variable sliding gear transmissions having a substantially upright forwardly and laterally swinging shift member for the selection and operation of said sliding gear transmission, the combination of longitudinally moving and laterally swinging shift bars operating said shift member, a rotating cam member and governor controlled selecting means for shifting said shift bars to cause said cam member to selectively operate said shift member.

16. In an automatic gear shift mechanism for variable gear transmissions, the combination of selecting means, a governor cooperating with and controlling the movement of said selecting means, connecting means connecting said governor with said selecting means and means for lengthening the movement of said connecting means to vary the operation of said selecting means by said governor.

FRANK E. WOODWARD.